United States Patent [19]

Baar

[11] 4,071,731

[45] Jan. 31, 1978

[54] MATRIX ENGRAVING BY ELECTRON BEAMS

[75] Inventor: Walter Baar, Kiel-Wik, Germany

[73] Assignee: Dr. -Ing. Rudolf Hell GmbH, Kiel, Germany

[21] Appl. No.: 550,576

[22] Filed: Feb. 18, 1975

[30] Foreign Application Priority Data

Mar. 16, 1974 Germany .............................. 2412685

[51] Int. Cl.2 .............................................. B23K 15/00

[52] U.S. Cl. .............................. 219/121 EB; 346/138; 90/13 R; 219/121 LM

[58] Field of Search .................. 219/121 EB, 121 EM, 219/121 L, 121 LM; 346/138, 139; 90/13 R

[56] References Cited

U.S. PATENT DOCUMENTS

| | | | |
|---|---|---|---|
| 3,618,464 | 11/1971 | Michaud, Sr. | 90/13 R |
| 3,747,080 | 7/1973 | Taylor | 346/138 |
| 3,816,698 | 6/1974 | Wellendorf et al. | 219/121 EB |
| 3,816,699 | 6/1974 | Wellendorf et al. | 219/121 EB |
| 3,925,607 | 12/1975 | Hauber | 346/138 |

*Primary Examiner*—J. V. Truhe
*Assistant Examiner*—Mark H. Paschall
*Attorney, Agent, or Firm*—Ernest F. Marmorek

[57] ABSTRACT

The invention provides an improvement for an apparatus which produces engraved printing forms via an electron beam device which is located in a vacuum chamber having an open side facing a peripheral surface of a printing form cylinder and defining therewith an air gap, and an arrangement for effecting relative movement of the vacuum chamber and printing form cylinder while maintaining the air gap. The inventive improvement comprises an annular member having an outer circumferential surface of a diameter corresponding to the outer diameter of the printing form cylinder, and cooperating annular bevelled contact faces provided on respective axial ends of the annular member and printing form cylinder so that, when the contact faces are coaxial and urged into abutment with one another, the outer circumferential surface constitutes an extension of the peripheral surface of the printing form cylinder.

7 Claims, 1 Drawing Figure

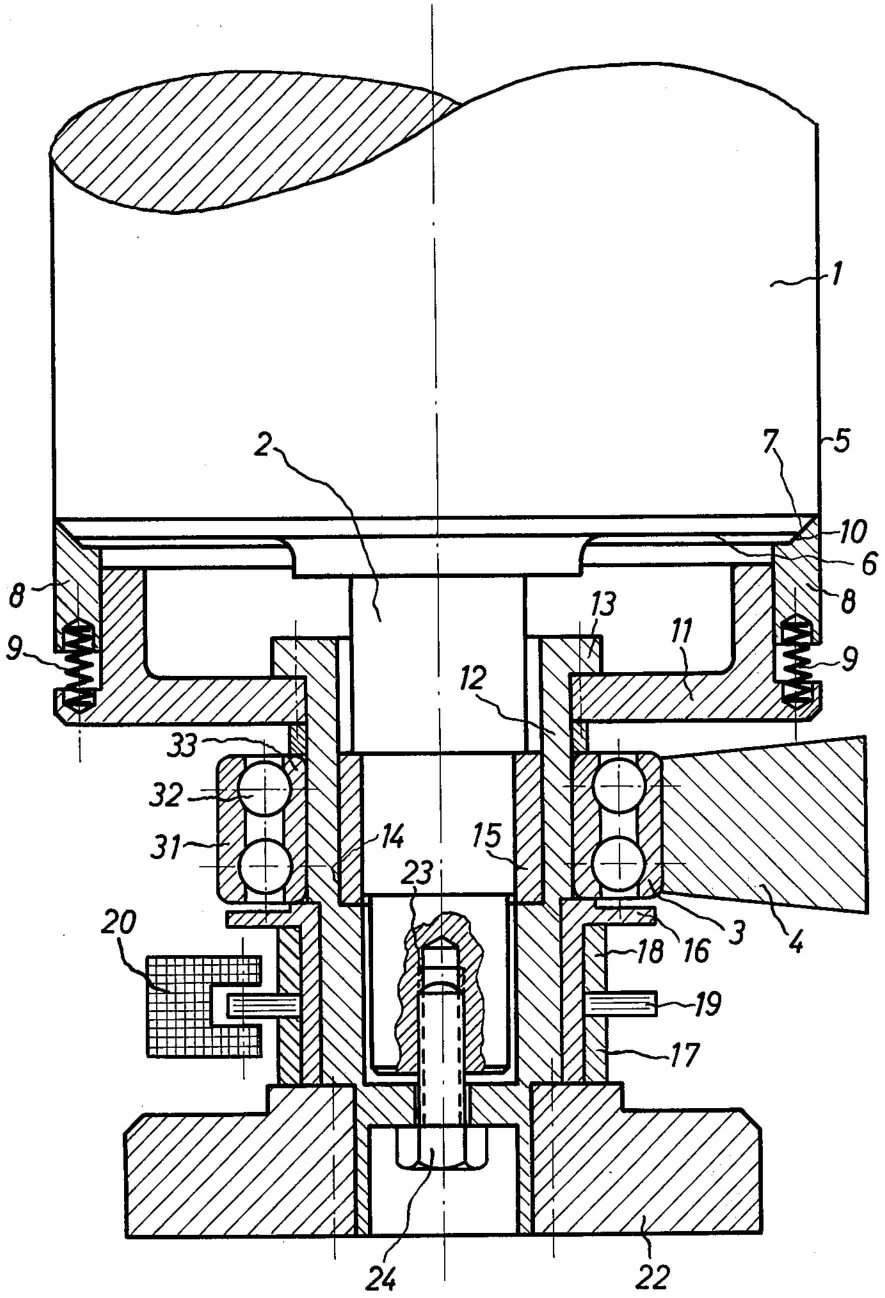
1
2
5
7
10
6
8
8
9
9
13
11
12
33
32
31
14
15
23
3
16
4
20
18
19
17
24
22

MATRIX ENGRAVING BY ELECTRON BEAMS

BACKGROUND OF THE INVENTION

This invention relates to apparatus for producing engraved printing forms, especially printing form cylinders.

The invention is an improvement on the apparatus disclosed in U.S. Pat. No. 3,816,698. That apparatus serves to produce screen-point printing forms, particularly printing form cylinders, by means of electron beam engraving. It provides an electron beam producing device which is located in a vacuum chamber that has a side which is open and faces the surface of the printing form and defines with this surface an air gap. The vacuum chamber and/or printing form can be moved relative to one another, while maintaining the gap. To permit engraving of the printing form up to the edge thereof without having to install the printing form in a vacuum chamber, the U.S. Patent in question provides an annular body which extends the edge of the printing form, for example, it has an outer circumferential surface that constitutes, when the ring is located adjacent an axial end of a printing form cylinder, an extension of the peripheral surface of the cylinder.

This concept of the aforementioned U.S. Patent is highly advantageous. However, its practical application is frequently hampered in that many of the printing form cylinders which are currently in use in the industry are of such a character that it is difficult to secure the annular body to an end face of the printing form cylinder. The peripheral surface of conventional printing form cylinders, and a portion of the end faces, is galvanically coated with a thin copper layer according to the Ballard method, for reasons which are well known to those conversant with this field. Since the edge of this copper layer is located on the axial end faces of the printing form cylinder, where the layer terminates, a precise mounting of the annular body on these axial end faces has in practice been found to be impossible. Moreover, even if such a mounting were not precluded by the aforementioned consideration, it would not be practical because the axial end faces of the printing form cylinder must be left free, since after the use of the cylinder it is necessary to peel off the copper skin, a process which starts at the axial end faces, in order to ready the cylinder for the application of a new copper layer. Special adaptations to overcome these problems are also not practical, since printers usually have a large number of printing form cylinders which represent a substantial monetary investment and must be re-useable time and time again, so that special-purpose adaptation is not practical.

SUMMARY OF THE INVENTION

Accordingly, it is an object of this invention to overcome the drawbacks of the prior art as outlined above.

More particularly, it is an object of the present invention to improve an apparatus for producing engraved printing forms of the type set forth in U.S. Pat. No. 3,816,698.

A further object of the invention is to provide such an improvement which is simple in structure and concept, and which achieves the purposes of the invention in an economically feasible and reliable manner.

In keeping with these objects, and still others which will become apparent from a reading of the following description and claims, one aspect of the present invention resides in an improvement on an apparatus for producing engraved printing forms via an electron beam device which is located in a vacuum chamber having an open side facing a peripheral surface of a printing form cylinder and defining therewith an air gap, and an arrangement for effecting relative movement of the vacuum chamber and printing form cylinder while maintaining the air gap. According to the invention, this improvement comprises an annular member having an outer circumferential surface of a diameter corresponding to the outer diameter of the printing form cylinder, and cooperating annular bevelled contact faces provided on respective axial ends of the annular member and printing form cylinder so that, when the contact faces are coaxial and urged into abutment with one another, the outer circumferential surface of the annular member constitutes an extension of the peripheral surface of the printing form cylinder.

It is a particularly advantageous aspect of the invention that the bevelled contact face on the printing form cylinder can be produced by turning, when the printing form cylinder (which has been newly galvanized to deposit the copper layer thereon) is sized to the requisite dimensions, since the sizing to remove material by turning in order to give the cylinder the necessary dimension, and the formation of the bevelled contact face on the cylinder, can be carried out in one operation.

Moreover, it is possible according to a further aspect of the invention to combine the arrangement of the annular member and the bevelled contact faces with a device which makes it possible to derive control signals which are precisely oriented with respect to the peripheral surface of the printing form cylinder.

The invention will be described hereafter with reference to an exemplary embodiment which is provided for purposes of explanation only. It should be understood that the extent of protection sought is defined exclusively in the appended claims.

BRIEF DESCRIPTION OF THE DRAWING

The single FIGURE is a fragmentary axial section illustrating only that portion of an apparatus according to the invention which is needed for an understanding of the inventive concept.

DESCRIPTION OF THE PREFERRED EMBODIMENTS

The general details of an apparatus with which the present invention is to be used, are those which are disclosed in U.S. Pat. No. 3,816,698. Those portions of the apparatus which are not necessary for an understanding of the present invention are therefore not described or illustrated therein, reference may be had to the aforementioned U.S. Patent for further details concerning these portions.

The drawing shows details of the apparatus insofar as they pertain to the present invention. Reference numeral 1 identifies the printing matrix, which in this case is in form of a printing form cylinder having at its opposite axial ends (only one shown) respective trunnions 2. Each trunnion is mounted for rotation in a support 4 by means of a bearing 3.

The printing form cylinder 1 has a peripheral surface 5 and an axial end face 6; at the junction of these faces 5 and 6, where one merges into the other, the printing form cylinder 1 is provided with an annular bevel 7. An annular member 8 is provided having an outer circumferential surface whose diameter corresponds to that of the printing form cylinder 1 so that, when the annular ring member 8 is pressed axially against the bevelled contact face 7, which it engages matingly with its own annular bevelled contact face 10, the outer circumferential surface of the annular member 8 constitutes an extension of the peripheral surface 5 of the printing form cylinder 1.

The annular member 8 is mounted on a mounting device 11 so that it can be shifted axially with reference to the printing form cylinder 1; the springs 9 urge it against the printing form cylinder 1, so that the bevelled contact faces 7 and 10 matingly engage one another. The springs 9 are advantageously equi-angularly distributed around the circumference of the annular member 8; they could also be replaced by different biasing means. The fact that the circumferential surface of the annular member 8 constitutes an axial extension of the peripheral surface 5 of the printing form cylinder 1 makes it possible to engrave the surface 5 of the printing form cylinder 1 right up to the point where the circumferential surface of the annular member 8 begins, without loosing the vacuum in the vacuum chamber (for which reference should be had to the disclosure of U.S. Pat. No. 3,816,698).

A sleeve 12 has a flange 13 on which the mounting device 11 is secured. The interior of the sleeve 12 is formed with a seat 14 for an inner bearing ring 15 which is normally shrink-fitted onto the trunnion 2 of the cylinder 1. The purpose of the sleeve 12 is to mount the anti-friction bearing 3 which is composed of an outer race 31, an inner race 33 and the bearing balls 32. An outer sleeve 16 is pushed part-way over the sleeve 12 and has secured on it, by means of spacing rings 17 and 18, a partial annular plate 19 which is scanned by a scanning system 20 that is only diagrammatically illustrated; this arrangement makes it possible to obtain screen-point related signals having a precise relationship with reference to the circumference of the cylinder 1. A coupling flange 22 is mounted on an axial end of the sleeve 12, and a screw 24 extends through an end wall of the sleeve 12 and is threaded into a tapped bore 23 of the trunnion 2, thus mounting the sleeve 12 on the trunnion 2. The manner in which the annular member 8 is mounted on the trunnion 2, that is as described above, greatly simplifies the mounting and assures a very precise journalling of the printing form cylinder 1 during the engraving operation. The reason for this latter benefit is the fact that the bearing ring which is normally shrunk onto the trunnion 2 as indicated above, is subject to wear which makes a precise journalling of the cylinder 1 impossible. By utilizing it in the manner described above, however, the bearing ring serves as a reference surface for a precision-journalling of the printing form cylinder in the engraving machine and the difficulty outlined above is overcome.

The invention has been illustrated on hand of a single exemplary embodiment described with reference to its use in conjunction with a printing form cylinder which is to be engraved by means of an electron beam. However, it should be understood that various modifications and changes in the exemplary embodiment are possible, and that the invention should be considered to include all such modifications and changes which would offer themselves readily to a person having ordinary skill in this field. Clearly, therefore, the invention is not to be considered limited as to the exemplary illustrated embodiment and the scope of protection sought is outlined exclusively in the language of the appended claims.

I claim:

1. In an apparatus for producing engraved printing forms via an electron beam device which is located in a vacuum chamber having an open side facing a peripheral surface of a printing form cylinder and defining therewith an air gap, and an arrangement for effecting relative movement of said vacuum chamber and printing form cylinder while maintaining said air gap, the improvment comprising:

an annular member having an outer circumferential surface of a diameter corresponding to the outer diameter of said printing form cylinder, said printing form cylinder having a trunnion;

cooperating annular bevelled contact faces provided on respective axial ends of said annular member and printing form cylinder, and a mounting device for said annular member secured on said trunnion and mounting said annular member for displacement axially of said printing form cylinder, so that, when said contact faces are coaxial and urged into abutment with one another, said outer circumferential surface constitutes an extension of said peripheral surface.

2. The improvement defined in claim 1; and further comprising biasing means bearing upon said mounting device and said annular member for urging the bevel thereof into abutment with the bevel of said printing form cylinder.

3. The improvement defined in claim 2, wherein said biasing means comprises springs which are equi-angularly spaced about a central axis of said annular member.

4. The improvement defined in claim 2, wherein said trunnion comprises a journal ring; and further comprising a sleeve surrounding said journal ring and being axially engageable with an end face of said printing form cylinder from which said trunnion extends, so as to serve as a journal for said trunnion.

5. The improvement defined in claim 4, said trunnion having a coupling flange, and said sleeve being provided with a receiver for said flange; and further comprising threaded means mounting said sleeve on and drawing it towards said end face of said printing form cylinder.

6. The improvement defined in claim 4 wherein said trunnion includes a bearing, and further comprising a partial annular plate accommodated in said sleeve intermediate said coupling flange and said bearing for said trunnion.

7. The improvement as defined in claim 2, and further comprising a partial annular plate connected with said mounting device.

* * * * *